United States Patent [19]

Fretwell

[11] Patent Number: 4,711,613
[45] Date of Patent: Dec. 8, 1987

[54] VEHICLE LIFT DEVICES

[75] Inventor: Percy Fretwell, Rochdale, England

[73] Assignee: Henderson Doors Limited, Romford, England

[21] Appl. No.: 602,734

[22] Filed: Apr. 23, 1984

[30] Foreign Application Priority Data

Apr. 28, 1983 [GB] United Kingdom ............... 8311632

[51] Int. Cl.⁴ .............................................. B60P 1/44
[52] U.S. Cl. .................... 414/550; 414/558; 414/917; 414/921
[58] Field of Search ........................ 414/537, 539–541, 414/545, 546, 548–550, 556, 558, 917, 921

[56] References Cited

U.S. PATENT DOCUMENTS

| | | | |
|---|---|---|---|
| 2,457,380 | 12/1948 | Kelberer | 414/537 X |
| 2,500,815 | 3/1950 | Gerli et al. | 414/917 X |
| 2,774,494 | 12/1956 | Malmström | 414/546 |
| 3,226,086 | 12/1965 | Lavieri et al. | 254/93 R |
| 3,263,835 | 8/1966 | Lugash | 414/558 |
| 3,269,567 | 8/1966 | Lugash | 414/546 |
| 3,599,810 | 8/1971 | Wanko | 414/558 |
| 4,124,130 | 11/1978 | Rohrs et al. | 414/539 |
| 4,214,849 | 7/1980 | Downing | 414/921 X |
| 4,273,217 | 6/1981 | Kajita | 414/921 X |
| 4,294,571 | 10/1981 | Tordella | 414/537 |
| 4,344,508 | 8/1982 | Peck | 414/917 X |
| 4,456,421 | 6/1984 | Robson | 414/546 |
| 4,476,959 | 10/1984 | Tortellier | 414/546 X |

FOREIGN PATENT DOCUMENTS

| | | | |
|---|---|---|---|
| 1056141 | 1/1967 | United Kingdom . | |
| 2067502 | 7/1981 | United Kingdom | 414/546 |
| 2107671 | 5/1983 | United Kingdom | 414/558 |
| 2112346 | 7/1983 | United Kingdom . | |

Primary Examiner—Joseph E. Valenza
Assistant Examiner—David A. Bucci
Attorney, Agent, or Firm—William R. Hinds

[57] ABSTRACT

A vehicle lift device comprises structure 23 which is fixed to the chassis beneath the vehicle floor 11, a parallel linkage 21 carrying a platform 50 and connected to the structure 23 for movement at a level beneath floor 11 about vertical axis 22 so that the linkage and platform can be moved between an operative position extending from the vehicle and a stowed position beneath the vehicle floor 11. A single ram 40 can move the linkage up and down for raising and lowering a load, for example a wheel-chair, to permit the load to be moved on to the floor through a doorway which is not obstructed by the lift device. The platform can be collapsed for storage and the linkage has nesting members 35a, 37 for resisting possible injury.

8 Claims, 8 Drawing Figures

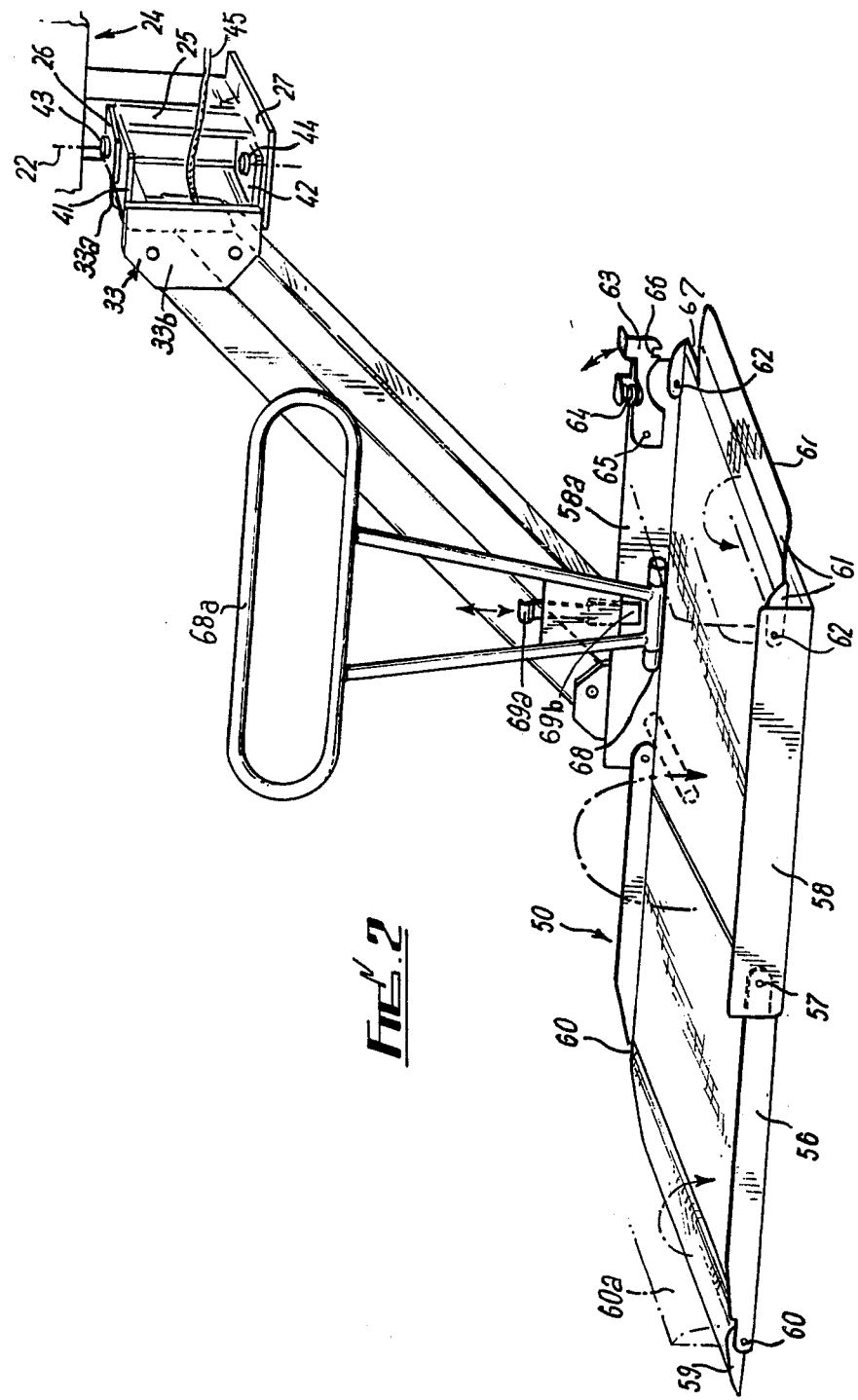

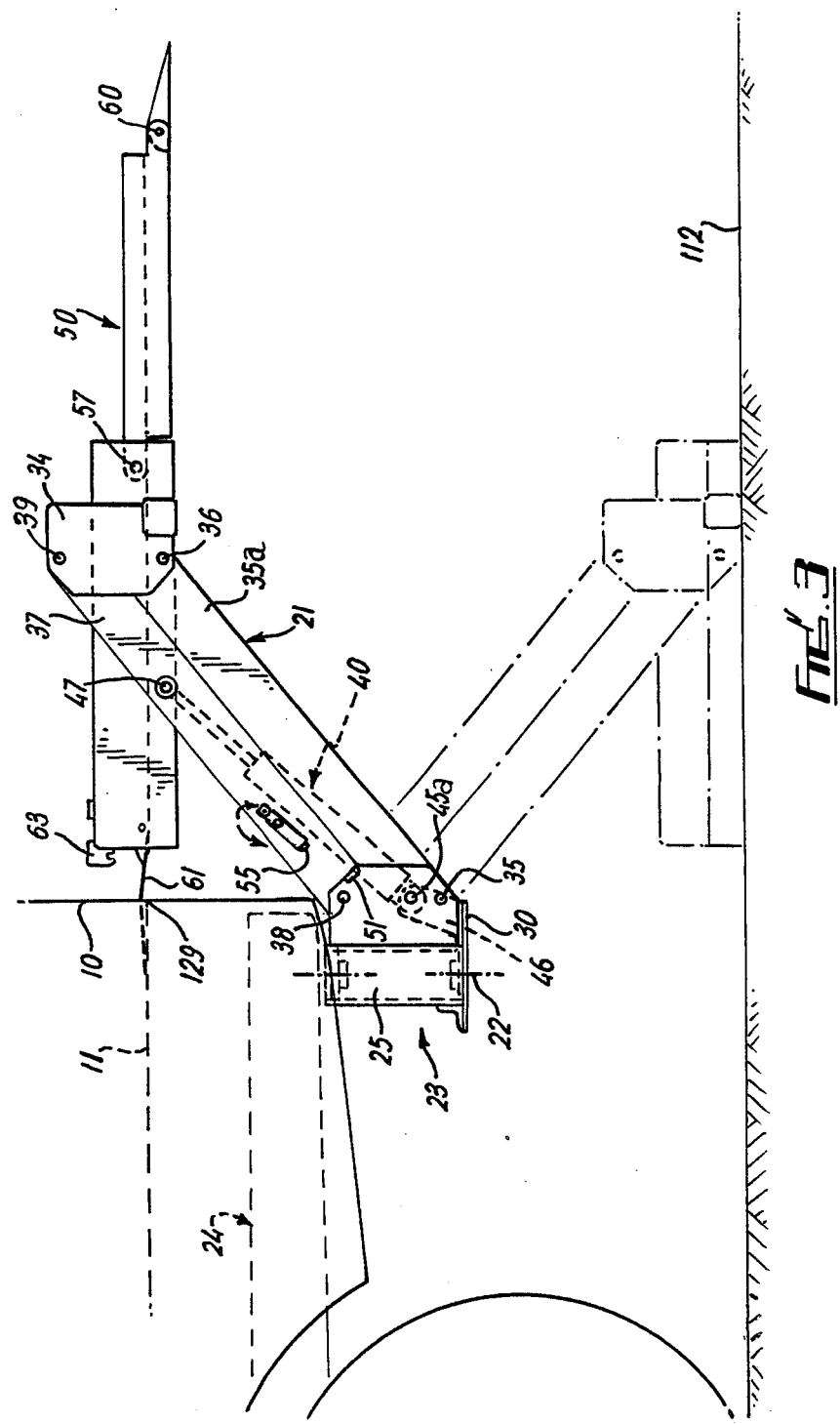

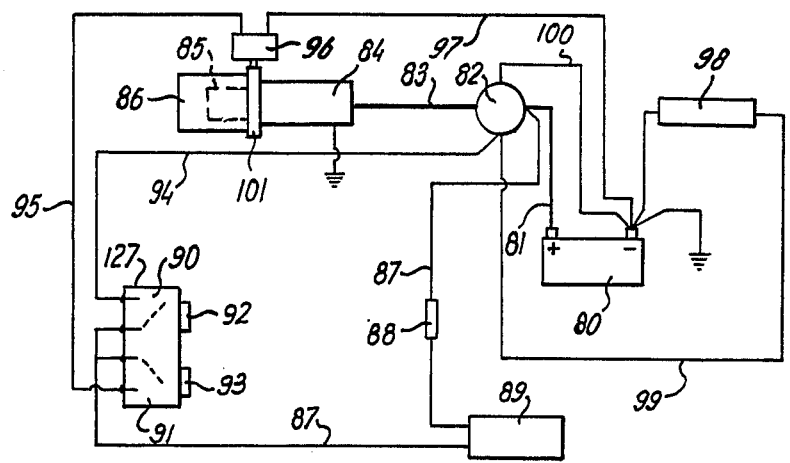
_FIG. 4_
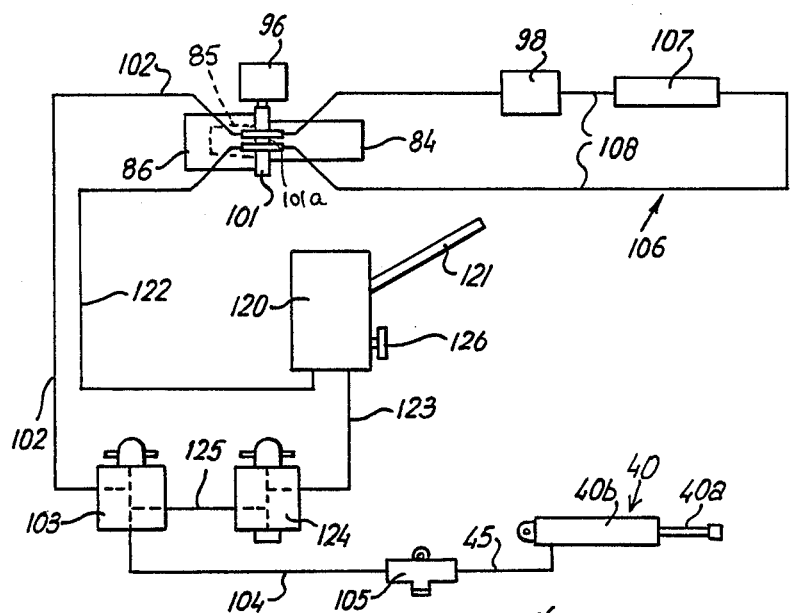
_FIG. 5_

VEHICLE LIFT DEVICES

This invention relates to vehicle lift devices and vehicles having such devices.

It is known to provide a vehicle with a lifting device mounted on the vehicle floor near a doorway of the vehicle body and including a platform which can be lowered by the lift device, to receive an article to be lifted, then raised to a height at which the article is transferred from the platform to the vehicle floor. Such a device partly blocks the doorway and undesirably occupies floor space and interior space in the vehicle.

According to one aspect of the invention a vehicle comprises a floor and a lift device including a platform, means mounting the lift device below the level of the floor for rotation about an upright axis between an operative position, in which the lift device extends from the vehicle, and an inoperative position, in which the platform is beneath the floor, said lift device including means for moving the platform up and down in the operative position, and a parallel linkage for connecting the platform to the mounting means, said upright axis being located beneath the floor, said means for moving being substantially wholly outwards of the upright axis in the operative position and extending between said mounting means and said parallel linkage.

Preferably the device in the inoperative position is entirely beneath the floor.

The device may be in a stowage compartment in the inoperative position.

There may be releasable adjustable stop means for limiting the downward movement of the platform, the stop means comprising two engageable elements, both rotatable with the lift device about the upright axis, and one of the elements movable up and down with the platform, the other of the elements being mounted only for rotation with the lift device.

Preferably the device can be raised in the inoperative position to engage the vehicle.

The device may comprise a single parallel linkage of upper and lower arms, and an hydraulic ram extending within the upper arm for operating the linkage, the platform being carried by the linkage.

The linkage may comprise members which nest together along their exposed lengths throughout the up and down movement for preventing laterally facing gaps between the members.

According to another aspect of the invention, a lift device for securing beneath a vehicle floor comprises structure for mounting beneath the vehicle floor, a parallel linkage, a platform carried by the linkage, a connection between the linkage and the structure permitting movement of the linkage about an upright axis in use, and a hydraulic ram for raising and lowering the linkage and platform about axes transverse to the said upright axis, said ram and said axes being located substantially wholly outwardly of said axis and on the same side thereof, said ram being mounted between said structure and said linkage.

According to a further aspect of the invention there is provided a lift device fitted to a vehicle having a floor, said device having a platform, a mounting for mounting said device below the level of the vehicle floor, said device being capable of rotating about a vertical axis in order to stow the lift, with platform attached, from its operative position, which extends from the vehicle, to an inoperative position beneath the vehicle floor level, a parallel linkage for connecting said platform to said mounting, and means for raising and lowering the platform in the operative position, said vertical axis being beneath the vehicle floor, and said means being located substantially wholly outwardly of the vertical axis in the operative position and extending from the mounting to the vicinity of the platform.

The invention includes a vehicle having such a device.

The invention may be performed in various ways and one specific embodiment with possible modifications will now be described by way of example with reference to the accompanying drawings, in which:

FIG. 2 is a perspective view of the lifting device in a lowered position;

FIG. 3 is a side view showing the device;

FIG. 4 is an electric control circuit;

FIG. 5 is a hydraulic circuit;

Figure 1:
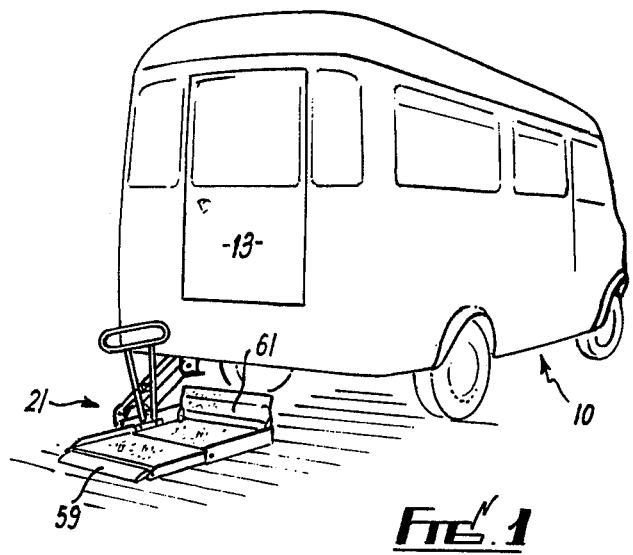
FIG. 1 is a perspective view of a vehicle with a lift device.

Referring to the drawings, a motor vehicle comprises a body 10 having a floor 11 and provided with a door 12 which may, for example, as shown be in the rear of the body and have a sliding or hinged door 13 but which could be in a side of the body.

A lift device 20 is provided and is located as viewed from the rear beneath the vehicle floor 11 adjacent the doorway. The device 20 includes a parallel-linkage arrangement 21 mounted at one end for rotation about a vertical axis 22 on structure 23 secured to the vehicle chassis 24 beneath the floor 11. The structure 23 can take various forms, for example a structure formed of angle-section steel in which are rotatably mounted top and bottom pivots defining axis 22. The arrangement provides an open hinge to permit entry of the hydraulic hose connected to a ram referred to later.

In the arrangement shown, structure 23 comprises upright plate 25 having top and bottom flat lugs 26, 27 extending inwardly. The plate 25 is bolted to the chassis 24 which includes spaced fore-and-aft members 28, cross-bracing 29 being provided as required. The lower lug 27 includes rear portion 30 in which are formed angularly spaced apertures 31, 32.

The vehicle body may be of monocoque construction in which the chassis is integral with the body shell.

The parallel-linkage arrangement 21 includes generally confronting end channel members 33, 34 an upwardly facing channel arm member 35a whose ends are received in and pivoted to the members 33, 34 at 35, 36 and a rolled hollow section or box section arm member 37 which is closely received in member 35a and whose ends are received in and pivoted to the members 33, 34 at 38, 39.

The channel member 33 has side plates 33a and web 33b and lugs 41, 42 extend from top and bottom of web 33b. Bolts 43, 44 respectively connect lugs 41 and 26 and lugs 42 and 27 and form pivot axis 22. The web 33b is in part removed to give access to hydraulic hose 45 connected to a ram 40. The hydraulic ram 40 with piston 40a and cylinder 40b is received within the members 35a, 37 and has cylinder 40b pivoted at 45a between upright lugs 46 on web 33b and a piston 40a pivoted at 47 to the sides of member 37. The pivot axes are, in the installed position of the lift device, horizontal. The end member 25 can pivot on structure 23 about the axis 22.

The pivots 35, 36, 38, 39 define the corners of a parallelogram, pivots 35, 36 being respectively vertically below pivots 38, 39; and pivots 35, 36, 38, 39, 45, 47 are transverse to axis 22 and below the vehicle floor 11.

The end member 34 has extending transversely from it a circular rod 48 received in a box section member 49 of a generally flat platform 50.

A lug 51 extends from plate 33a. A stop arm 52 is pivoted at 53 to a side of member 37 and includes knob 54 enabling the arm 52 to be swung upwardly from an operative position, in which the end 55 of the arm can engage lug 51 as described later, and an inoperative position. This arrangement is indicated schematically in FIG. 3 and is illustrated in more detail in FIG. 8.

The platform may take various forms but as shown has a first portion 56 pivoted at 57 to a second portion 58 for movement between an open position shown and a closed position overlying portion 58. A small ramp portion 59 is pivoted at 60 to portion 56 and the pivot 60 includes pins on portion 56 engaged in elongate slots in ramp 59 so that with the pins at one end of the slots the ramp can be raised as shown at 60a and the ramp is then moved to bring the pins to the other ends of the slots releasably to hold the ramp in upright position to resist movement of a wheel-chair off the platform which has upright sides for this purpose. Another ramp 61 is pivoted at 62 to the other end of portion 58. A catch 63 is biassed downwardly by spring 64 and can be swung about pivot 65 so that when ramp 61 is swung upwardly the outer edge 67 of a ramp side extension can be engaged in a notch 66 releasably to hold the ramp 61 upright.

A safety handrail 68a is pivoted at 68 to platform portion 58 can be swung down to overlie portion 58 and is held releasably in the upright position by a slide catch 69a fixed to the handrail releasably engaging behind an upright plate 69b secured to side wall 58a of portion 58.

A detent arm 69 is pivoted at 70 to plate 33a and at its end is pivoted a detent plunger 71 urged downwards by spring 72. The plunger 71 is engageable in apertures 31, 32 as described later.

An electrical operating circuit in FIG. 4 comprises a battery 80, normally the vehicle battery, from which line 81 connects to a starter solenoid 82 connected to motor 84 by line 83. The motor 84 can drive a hydraulic pump 85 in hydraulic reservoir 86. Line 87 connects solenoid 82 via fuse 88 and isolator switch 89 to the positive side of normally open up and down contact pairs 90, 91 respectively operable by buttons 92, 93. Line 94 connects the fixed up contact to continue the positive circuit to solenoid 82 and line 95 connects the fixed down contact to one end of a coil 96 the other end of which is connected by line 97 to the battery negative terminal. A solenoid-operated normally closed hydraulic valve 98 is connected across the battery via line 99 connected to positive line 94. The coil 96 controls a valve 101. Line 100 provides a negative return line for the solenoid 82.

In the hydraulic circuit FIG. 5 the pump 85 delivers pressure fluid to ram 40 to raise the lift via valve 101, line 102, manually operable valve 103, line 104 and T connector 105 having a blanking plug used for pressure testing. When the pump 85 is de-energized, the platform 50 lowers under its own weight, the oil returning to the reservoir on line 102 as described later. In the present case an excess oil circuit 106 is included having valve 98 and manually adjustable flow control valve 107 in line 108 which allows excess oil to flow through valves 98, 107 and line 108 to the reservoir.

To raise the platform, up button 92 is pressed to close contacts 90 and this energizes starter solenoid 82 which connects line 81 to line 83 to start the motor 84 and thus the pump 85 and also opens valve 98.

Upward movement of the linkage 21 is limited by bolts 110 on end member 34 engaging a plate 111 on member 37. By adjustment of the limit bolts 110 the top position can be adjusted. When lowered, the platform can rest on the ground 112 as shown dotted in FIG. 3. If up button 92 is kept pressed after the linkage 21 reaches the top stops 110, the pump 85 continues to run but excess pressure is prevented by flow through pressure release valve 101a between line 102 and reservoir 86.

When up button 92 is released, the pressure remains in the ram 40 to keep the platform raised, but solenoid 82 is de-energized to stop the motor 84 and to close valve 98.

To lower the platform, the down button 93 is pressed. Coil 96 is energized through line 95 to move valve 101 so that pressure line 102 is connected to reservoir 86 and the platform slowly lowers under gravity. After a short downward movement the stop 55 engages lug 51 to stop downward movement so that the platform will only lower to the ground if the stop 55 has first been pivoted to the inoperative position.

In the present case a hand pump is provided for use if the battery supply fails. A pump 120 has handle 121, preferably detachable, and can draw oil from the reservoir through valve 101 and line 122 and deliver under pressure through line 123, manually operable valve 124, line 125, valve 103, line 104 to ram 40. A manually operable valve 126 controls a bypass circuit for the pump 120. Thus with valve 126 closed, the handle 121 can be operated to supply the ram with valve 103 in a position to connect lines 125, 104 but not lines 102, 104. To lower the ram, valve 126 is opened; the speed of lowering can be controlled by the degree of opening of valve 126. When the ram is being operated by pump 85, valve 124 is closed.

The switches 90, 91 may be in a hand set casing 127 which is carried on a cable so as to be operable by an attendant outside the vehicle.

The valves, pump, motor and parts of the control circuits can be located as desired; they may for example be located behind a small door 128 in the rear body wall as shown schematically at 129a.

Figure 7:
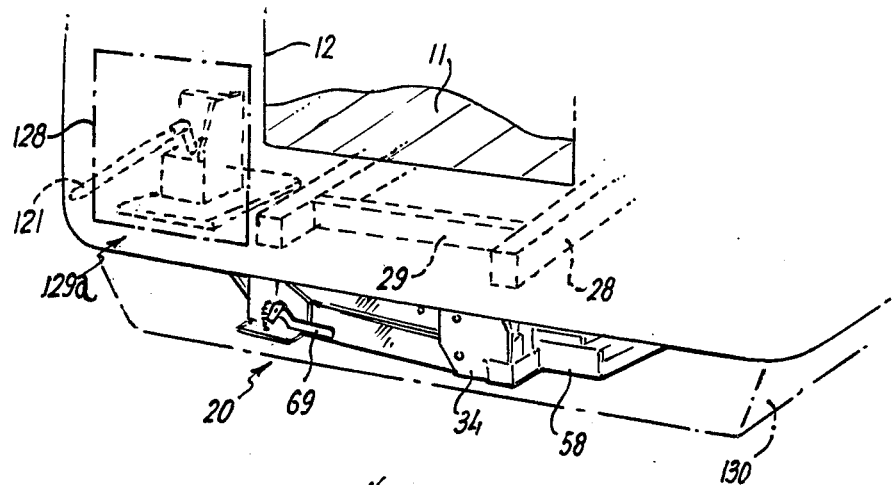
FIG. 7 is a perspective view showing the device stowed.
Figure 6:
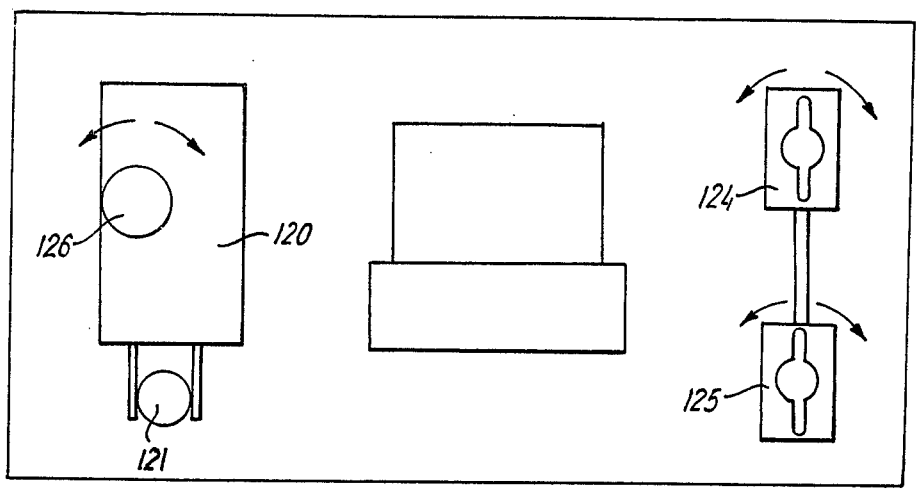
FIG. 6 is a schematic control device.

When not in use, the device is rotated to a stowed position under the vehicle floor as shown in FIG. 7. In this position the lift device is entirely beneath the vehicle floor as viewed from the rear and normally is entirely beneath the floor 11 as viewed in plan as shown in FIG. 3 but in some cases the device may extend slightly to the rear of the vehicle body.

In some cases the vehicle is fitted with a false floor above the original floor and the structure 23 is fitted between these floors and the device is stowed between these floors, so that the false floor acts as floor 11 and the term floor is to be understood as including this possibility. The false floor may extend only part way across and/or along the original floor to form a compartment so that the lift is stowed in the compartment beneath the false floor.

In the stowed position the plunger 72 is in aperture 32 to resist movement about vertical axis 22.

The device is normally swung to the stowed or inoperative position with stop 55 engaging lug 51 so that when the lift is swung out it must be raised slightly to enable stop 55 to be moved before the lift can be lowered. The stop 55 is adjustable to adjust the stowed height.

Figure 8:
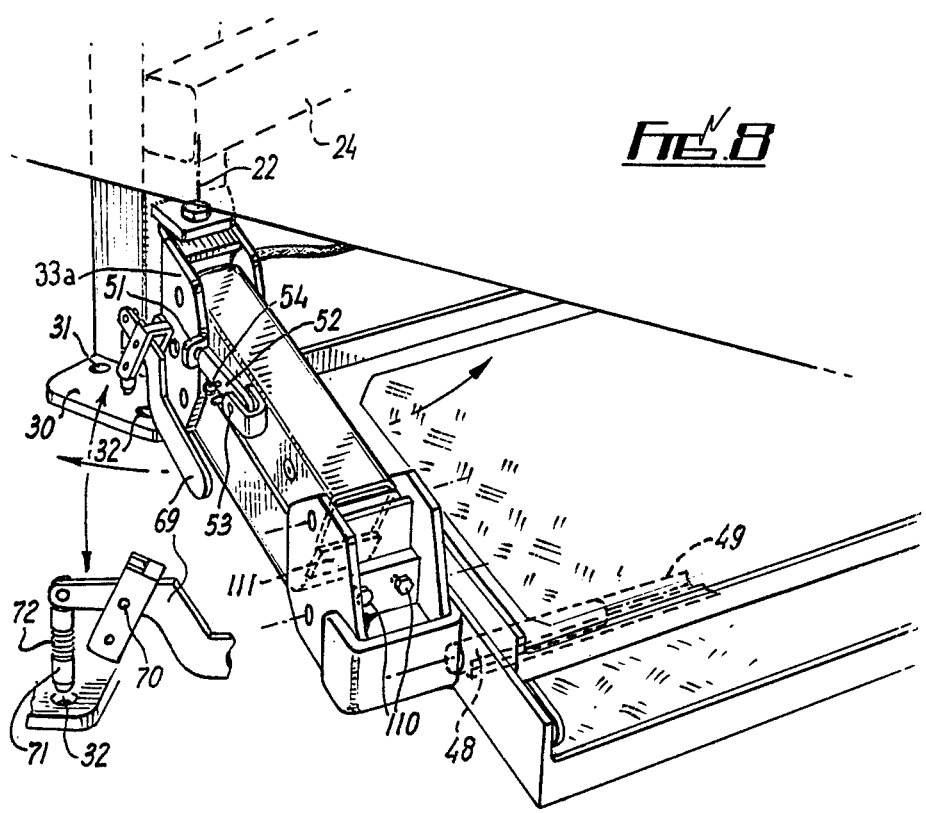
FIG. 8 is a perspective view of the device partly stowed.

When it is desired to use the device, the plunger 71 is raised by depressing handle 69 and the platform and linkage are swung about vertical axis 22 through the position of FIG. 8 to a position extending rearwardly of the vehicle and plunger 71 locates in aperture 31. The ram is now retracted to pivot the links 35a, 37 clockwise as seen in FIG. 3 to lower the platform on to the ground 112 as shown in FIGS. 1 and 3.

Due to the parallel-linkage the platform 50 remains horizontal during the lifting and lowering movements. Energizing the ram 40 now lifts the platform and an article, for example a wheel-chair, to the top position shown in FIG. 3 with the top surface of the platform at the same level as the floor 11. The article can now be transferred into the vehicle and if necessary the pivoted plate 61 may be used to bridge any gap between the platform and the floor. The door sill is shown at 129 (FIG. 3).

Adjustable limit stops, for example similar to bolts 110 can be provided to determine the level of the platform in the bottom position.

The structure 23 is suitably braced and the ram and ram pivots 45, 47 are suitably sized and located for the desired movement, bearing in mind the maximum contemplated load on the platform, e.g. 250 kg.

The storage or stowed space for the device (linkage 21 and platform 50) may be defined by a compartment 130 beneath the vehicle floor having a rear door. This serves to keep the platform clean when stowed.

After swinging into the stowed position the ram is preferably energized to raise the platform to engage (e.g. seals) beneath the vehicle floor—this should reduce or eliminate any undesirable vibration or noise during transit.

Because the ram can be energized to raise the platform in the stowed condition, the height of the platform when it is swung into the stowed condition can be selected to avoid obstacles depending from the underneath of the vehicle, whereafter the platform can be raised to engage beneath the floor.

The members 35a, 37 are sized to always overlap so as to nest throughout their exposed lengths so that there is no laterally facing gap between them during their up and down movement, see FIG. 3, so that a user cannot insert his fingers between the members thus avoiding possible injury.

It will be understood that the lift device is not mounted on the vehicle floor and does not obstruct the doorway above the floor or the vehicle floor during the stowed, travelling, position.

The platform is stowed generally horizontal and may be sized so as not to require folding before stowage.

The device is particularly, but not exclusively, intended for use by the disabled.

The device may be installed in a vehicle during manufacture or fitted to an existing vehicle.

I claim

1. A vehicle comprising a floor, and a lift device including a platform, means mounting the lift device below the level of the floor for rotation about an upright axis between an operative position, in which the lift device extends from the vehicle, and an inoperative position, in which the platform is beneath the floor, said lift device including means for moving the platform up and down in the operative position, and a parallel linkage for connecting the platform to the mounting means, said upright axis being located beneath the floor, said means for moving being substantially wholly outwards of the upright axis in the operative position and extending between said mounting means and said parallel linkage.

2. A vehicle as claimed in claim 1, including releasable, adjustable stop means for limiting the downward movement of the platform, said stop means comprising two engageable elements, both rotatable with the lift device about the upright axis, and one of the elements movable up and down with the platform, the other of the elements being mounted only for rotation with the lift device.

3. A vehicle as claimed in claim 1, in which the lift device can be raised in the inoperative position to engage the platform with the vehicle.

4. A vehicle as claimed in claim 1, in which the device comprises a single parallel linkage of upper and lower arms, and an hydraulic ram located between the arms for operating the linkage, the platform being carried by the linkage.

5. A vehicle as claimed in claim 4, in which the linkage comprises members which nest together along their exposed lengths throughout the up and down movement for preventing laterally facing gaps between the members.

6. A lift device for securing beneath a vehicle floor comprising structure for mounting beneath the vehicle floor, a parallel linkage, a platform carried by the linkage, a connection between the linkage and said structure permitting movement of the linkage about an axis upright in use, and an hydraulic ram for raising and lowering the linkage and platform about axes transverse to the said upright axis, said ram and said axes being located substantially wholly laterally of said axis and on the same side thereof, said ram being mounted between said structure and said linkage.

7. A lift device as claimed in claim 6, in which the linkage comprises members which nest together along their exposed lengths throughout the up and down movement for preventing laterally facing gaps between the members.

8. A lift device fitted to a vehicle having a floor, said device having a platform, a mounting for mounting said device below the level of the vehicle floor, said device being capable of rotating about a vertical axis in order to stow the lift, with platform attached, from its operative position, which extends from the vehicle, to an inoperative position beneath the vehicle floor level, a parallel linkage for connecting said platform to said mounting, and means for raising and lowering the platform in the operative position, said vertical axis being beneath the vehicle floor, and said means being located substantially wholly outwardly of the vertical axis in the operative position and extending from the mounting to the vicinity of the platform.

* * * * *